Figure 1:
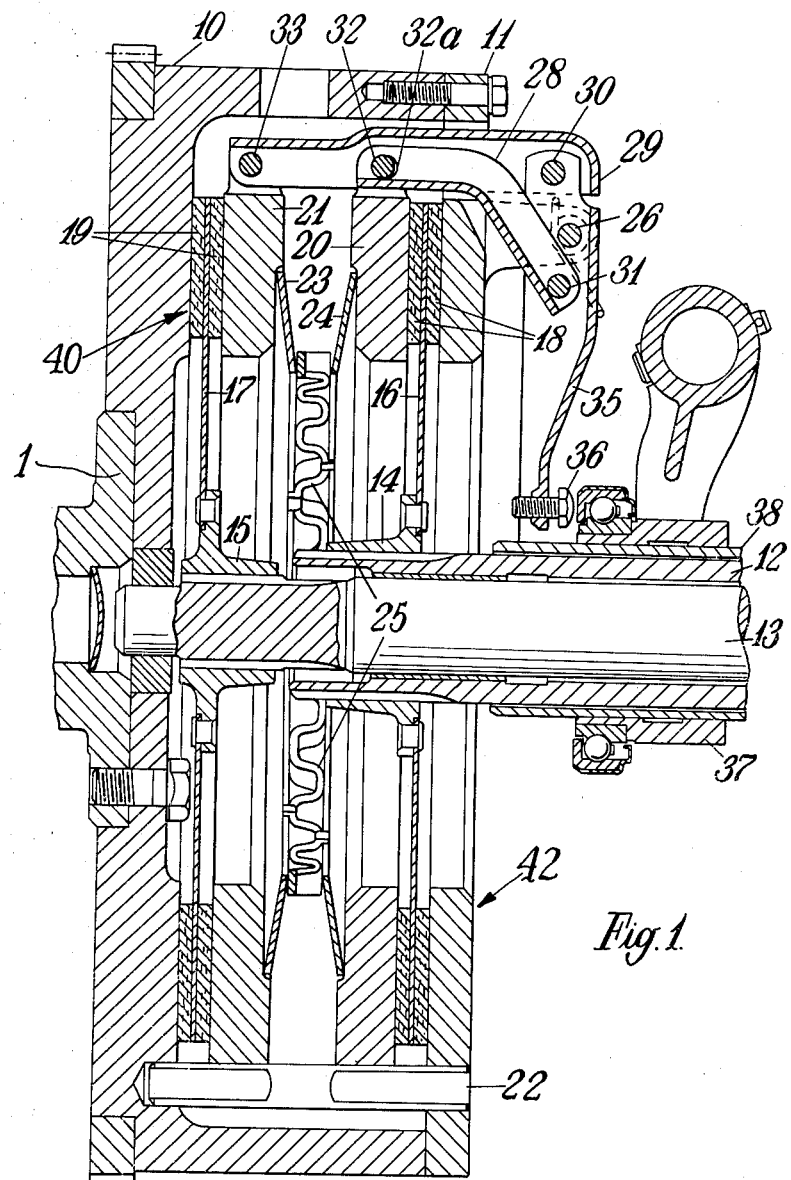

Nov. 2, 1965

F. J. SMITH ETAL 3,215,233

DUAL FRICTION CLUTCHES

Filed June 10, 1963

2 Sheets-Sheet 1

FREDERICK J. SMITH
EDWARD GREEN
INVENTORS

BY John R. Faulkner
Robert E. McCollum

ATTORNEYS

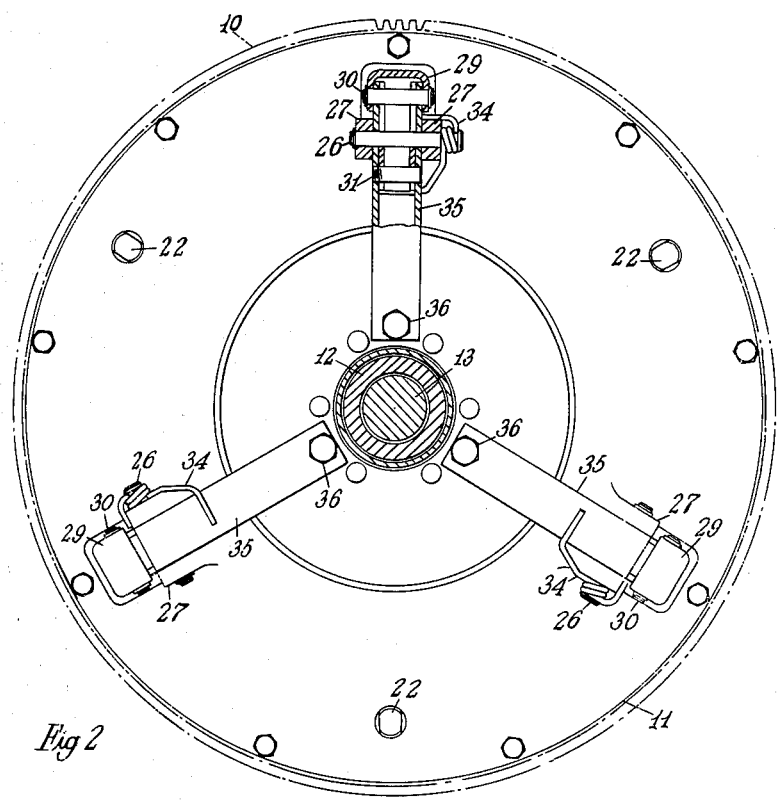

United States Patent Office 3,215,233
Patented Nov. 2, 1965

3,215,233
DUAL FRICTION CLUTCHES
Frederick J. Smith and Edward Green, Romford, England, assignors to Ford Motor Company, Dearborn, Mich., a corporation of Delaware
Filed June 10, 1963, Ser. No. 286,830
1 Claim. (Cl. 192—48)

This invention relates to a friction coupling assembly, and more particularly to a multiple clutch or brake assembly wherein the separate elements are sequentially engaged or disengaged.

In many installations having one shaft normally engaged with a number of other shafts, it is often desirable to disconnect the drive to one or more of the shafts without necessarily breaking the driveline to the remaining shafts.

Such an instance might occur, for example, in connection with a tractor assembly, where the power from the input shaft may be supplied to a transmission input shaft as well as to an accessory drive power take-off shaft. In such a case, it is often desirable to disconnect the input shaft from the transmission while maintaining the power take-off shaft connected so that the accessories can be driven without causing movement of the vehicle. Prior assemblies of this type usually necessitate separate clutch controls to accomplish this operation, and then permit the disengagement only either alternately or independently, and not generally sequentially. The duplication of controls thus increases the cost of manufacturing, and makes the system more complex for the operator.

The invention provides a purely mechanical assembly with dual clutch or brake elements that are sequentially engaged or disengaged by a single actuating lever so that the transmission drive shaft can be disconnected without disconnecting the power take-off shaft from the main engine input shaft. Thus, the tractor or vehicle can be moved to the desired location, and the vehicle driveline broken without disconnecting the driveline to the power take-off shaft. This is accomplished in a simple manner by purely mechanical means.

The assembly consists of a number of spaced driven clutch elements each connected to a separate power output shaft and adapted to be engaged with a common power input clutch member. Presser plates, associated with each of the clutch parts, are connected individually by force transmitting links to a common actuating lever, one of the links having a lost motion connection so that movement of the lever effects a sequential engagement or disengagement, as desired.

It is therefore an object of the invention to provide a plural friction coupling assembly that is simple in design, economical to manufacture, and provides individual and collective operation of the various coupling members in a sequential manner.

It is a further object of the invention to provide a plural clutch assembly that is progressively or sequentially operated by means of a single actuating lever common to all of the clutch members.

It is a further object of the invention to provide a dual clutch assembly having the clutches sequentially operated by purely mechanical means consisting of force transmitting links connected to each of the clutches and to a common actuating lever, one of the links having a lost motion connection to the clutch element associated with it for providing a delay in its actuation while the other clutch elements are being actuated.

Other objects, features, and advantages of the invention will become apparent upon reference to the succeeding detailed description thereof, and to the drawings illustrating the preferred embodiment thereof; wherein, FIGURE 1 is a cross-sectional view of a clutch assembly embodying the invention; and, FIG. 2 is an elevational rear view of the clutch assembly with parts shown in section.

FIGURE 1 shows a clutch assembly having torque delivered to it from a power input shaft 1. The shaft may be connected to any suitable source of power, such as the internal combustion engine, not shown, for a tractor vehicle. Shaft 1 is bolted to a conventional flywheel having a drum-like part 10 and a washer-like disc 11. The disc constitutes a reaction member and stop for the axial movement of one of the clutch packs, as will be described.

A pair of relatively rotatable driven shafts 12 and 13 are axially aligned with input shaft 1, shaft 12 being telescopically mounted on shaft 13. The latter shaft is piloted at its forward end in shaft 1 on a bearing, as shown. The hubs 14 and 15 of a pair of annular driven friction clutch discs 16 and 17 are slidably splined to shafts 12 and 13 at their forward ends, friction faces 18 and 19 of a suitable material being bonded to them.

The clutch assembly includes two washer-like presser plates 20 and 21 axially spaced from but mutually adjacent one another. The plates are each connected to flywheel housing 10 by three pins 22 (FIGURE 2) for rotation with it as a unit. The clutch discs 16 and 17 are interposed between the respective presser plates 20 and 21 and the coperating faces on the associated flywheel part 10 and disc 11.

A pair of oppositely facing Belleville springs 23 and 24 continuously load the presser plates 20 and 21 in opposite axial directions to press the friction faces 18 and 19 into non-rotative engagement with the flywheel 10 and disc 11. The clutch assembly is therefore always biased to an engaged position, rotataing both driven shafts 12 and 13 at input shaft speed. The springs 23 and 24 are located radially against annular steps in relieved portions of presser plates 20 and 21, and are held spaced apart by a corrugated ring element 25. The corrugations allow a free supply of cooling air to pass through the dual clutch.

The clutch presser plates are adapted to be actuated or moved axially to effect release of the clutches by means of force transmitting links 28 and 29 connected to a common actuating lever 35. Three sets of links 28 and 29 and lever 35 are shown in FIGURE 2 spaced one hundred and twenty degrees apart, not only for favorable distribution of stresses, but also for equal transmission of forces around the periphery of the clutch assembly. Since all the sets operate as a unit, and in the same manner, only one will be described.

Lever 35, which is substantially U-shaped in cross section, is fulcrumed on a pivot pin 26 having opposite ends secured in a pair of spaced lugs 27. The lugs project axially from disc 11 and are integral with it. The force transmitting links 28 and 29 are pivotally secured at their rearward ends to lever 35 by pins 31 and 30, respectively. The pins are fixed in the sides of the lever at locations radially inwardly and outwardly of the fulcrum 26, for a purpose which will be described. Each of the links is channel-shaped in cross section, the channels being inverted with respect to each other. Their forward ends are pivotally secured to presser plates 20 and 21 by pins 32 and 33.

The pin 33 has substantially no movement relative to presser plate 21, other than a pivotal one, and is mounted in the side walls of link 29 in holes that are of substantially the same diameter. Therefore, no radial displacement of the pin relative to the link occurs. Pin 32, however, is mounted in elongated holes or openings in the side walls of link 28 so that a clearance 32a exists between the pivot pin 32 and the slotted hole. That is, the pin 32, while it has substantially no movement other than a pivotal one relative to presser plate 20, has a lost motion connection with link 28 so that the link can move a slight distance axially without effecting a movement of pin 32 and therefore the presser plate 20.

To prevent undue vibration of the lever mechanism when the clutches are disengaged, a torsion spring 34 is provided with its central portion encircling the pivot pin 26 and its opposite end portions overlying the lever 35 and one lug 27. The spring is relatively weak and is ineffective to overcome the force exerted by the Belleville springs 23 and 24. It merely serves to hold the elements in position.

As is usual in clutches of this type, the inner end of the several levers 35 are pivotally movable about their fulcrums 26 by a thrust collar 37 carried by a sleeve 38 surrounding the shafts 12 and 13. The collar is movable axially generally by a clutch pedal or lever under the control of the tractor operator, and engages a button 36 on the lever. The button is shown as being adjustable so as to accommodate for slack in the parts due to wear. That is, if the clutch faces wear, a longer axial travel of the collar 38 would be required to effect disengagement of the clutches. By adjusting button 36, the collar will have the same travel regardless of wear.

It will be noted that with the construction as shown, the leverage ratio is substantial, i.e., the effective distance of the button 36 from the fulcrum 26 is several times as long as the effective distance between fulcrum 26 and pivot pins 30 and 31.

In operation, springs 23 and 24 normally maintain the drive and driven clutch faces engaged thereby rotating the shafts 12 and 13 at the speed of shaft 1. In order to declutch the transmission, the driver causes the thrust bearing collar 37 to be moved forwardly, or to the left in FIGURE 1, to rotate the levers 35 clockwise (FIGURE 1) about fulcrums 26. The links 29 instantaneously move presser plate 21 to the right against the force of spring 23, and the clutch 40 becomes disengaged. Simultaneously, links 28 are moved axially to the left. However, because of the clearance 32a, the presser plate 20 is not immediately moved, since the left-hand end of the slot merely moves away from the pin. Thus, clutch 40 is disengaged without effecting a disengagement of the power take-off shaft clutch 42.

If it is desired to now disengage clutch 42, collar 37 is moved farther to the left, moving links 28 in the same direction. At this point, the right-hand end of the slot in the link 28 engages pin 32 and moves presser plate 20 to the left out of engagement with the faces 18. Clutch 42 is thus disengaged.

Sequential engagement is effected in a reverse order, the return movement of the collar 37 to the right first permitting spring 24 to engage clutch 42 by maintaining the pin 32 against the right-hand end of the slot, and then permitting spring 23 to engage clutch 40.

While the drawings illustrate the invention as a clutch assembly consisting of two units, it will be clear that a greater number could be used simply by adding the appropriate torque transmitting link and connecting it to the lever by an appropriate lost motion connection. The amount of lost motion would be controlled selectively to cause any variety of sequences of operation; that is, sequentially and cumulatively; partially sequential and partially collective. With the use of more than two clutch packs, therefore, two or more clutch packs could be actuated simultaneously, with the remaining being operated sequentially, or all sequentially, or all except one concurrently, for example.

While the invention has been illustrated in its preferred embodiment as a dual clutch assembly, it will be clear to those skilled in the arts to which the invention pertains that it would have equal applicability as a brake assembly, and that many changes and modifications may be made thereto without departing from the scope of the invention.

We claim:

A friction coupling comprising a first annular coupling member having a pair of axially spaced friction surfaces, second and third axially spaced friction surface members between and adjacent said pair of surfaces for engagement therewith, spaced presser plates between said second and third members and movable axially thereagainst or away therefrom to effect engagement or disengagement of said first and second and third friction surfaces, means normally biasing said plates apart to effect engagement of said friction surfaces, and actuating means to progressively move said presser plates together, said actuating means including a pair of internested axially movable force transmitting links each pivotally secured near one end to a presser plate, a radially disposed common actuating lever pivotally secured to a portion of said first coupling member, means pivotally connecting the opposite end portions of said links to points on said lever above and below the pivotal connection to said outer clutch member, and lost motion means pivotally connecting one of said links to its presser plate with a limited axial sliding movement, the pivotal movement of said lever initially axially moving one link and presser plate and subsequently effecting movement of said other link and presser plate.

References Cited by the Examiner

UNITED STATES PATENTS

| 2,136,049 | 11/38 | Hering | 192—48 |
| 2,854,110 | 9/58 | Senkowski et al. | 192—48 |
| 2,880,833 | 4/59 | Stevenson et al. | 192—48 |
| 2,899,897 | 8/59 | Ludwig | 192—48 |
| 3,018,863 | 1/62 | Elfes | 192—48 |
| 3,021,931 | 2/62 | Holz | 192—48 |

FOREIGN PATENTS 1,191,930  10/59  France.

DON A. WAITE, *Primary Examiner.*

ROBERT C. RIORDON, DAVID J. WILLIAMOWSKY,
*Examiners.*